United States Patent [19]

Koehle

[11] Patent Number: 4,630,646
[45] Date of Patent: Dec. 23, 1986

[54] BEVEL END PROTECTOR

[75] Inventor: Siegfried E. Koehle, Panama City, Fla.

[73] Assignee: Berg Steel Pipe Corp., Panama City, Fla.

[21] Appl. No.: 790,274

[22] Filed: Oct. 22, 1985

[51] Int. Cl.[4] .............................................. F16L 55/10
[52] U.S. Cl. ................................. 138/96 R; 138/96 T
[58] Field of Search ................. 138/96 T, 96 R, 89, 138/109, 165, 167; 220/236, 237; 285/382.4, 421

[56] References Cited

U.S. PATENT DOCUMENTS

| | | |
|---|---|---|
| 76,345 | 4/1908 | Purdy . |
| 134,978 | 8/1920 | Schirra . |
| 653,898 | 7/1900 | Blakey . |
| 1,600,860 | 9/1926 | Young .............................. 138/96 T |
| 1,715,792 | 6/1929 | Shrum . |
| 2,098,087 | 11/1937 | Engstrom ........................ 138/96 T |
| 2,143,480 | 1/1939 | Sunderman ..................... 138/96 T |
| 2,156,221 | 4/1939 | Kahn et al. . |
| 2,196,454 | 4/1940 | Kahn et al. . |
| 2,238,643 | 4/1941 | Hicks .............................. 138/96 T |
| 2,263,223 | 11/1941 | Protin .............................. 138/96 T |
| 2,709,456 | 5/1955 | Hillix . |
| 2,824,579 | 2/1958 | Groh et al. . |
| 3,776,253 | 12/1973 | Yamaguchi et al. . |
| 4,155,574 | 5/1979 | Hulsey . |
| 4,379,471 | 4/1983 | Kuenzel ........................... 138/89 |

FOREIGN PATENT DOCUMENTS

| | | | |
|---|---|---|---|
| 0100244 | 2/1984 | European Pat. Off. ........ | 138/96 R |
| 327682 | 10/1920 | Fed. Rep. of Germany .... | 138/96 R |
| 1912803 | 9/1970 | Fed. Rep. of Germany .... | 138/96 R |
| 1206497 | 9/1970 | United Kingdom ............ | 138/96 R |

Primary Examiner—Stephen Marcus
Assistant Examiner—Leo James Peters
Attorney, Agent, or Firm—Beveridge, DeGrandi & Weilacher

[57] ABSTRACT

A bevel end protector for protecting the bevel end of a pipe includes an expansible portion inserted into the pipe. The protector is provided with a portion which can be expanded outwardly to secure the protector within the pipe by application of a force thereto using a removable cooperating element.

10 Claims, 7 Drawing Figures

BEVEL END PROTECTOR

The present invention relates generally to a low cost, simply-constructed end protector for protecting the finished ends of pipes or tubes during the storage, shipping and handling of such. The invention also relates to a method of expeditiously and economically protecting the beveled ends of pipes or tubes as well as to a method for fabricating end protectors in accordance with the present invention.

BACKGROUND OF THE INVENTION

Bevel end protectors are commonly used in the steel pipe industry to protect the finished ends of steel pipes and tubes. The majority of prior art end protectors comprise a sleeve-like member with means for securing that member to the outside end of the pipe.

End protectors adapted for insertion into the pipe to provide protection from therein are also familiar to the art. U.S. Pat. No. 2,196,454 discloses a thread protector for preserving both the interior and exterior threads of a pipe. The protector of that patent includes a collar-like inner shell which is expandable to tightly bear against the interior of the pipe by means of a pair of brackets arranged at each end of the shell and a bolt rotatably received by each bracket. Rotation of the bolt within the brackets effects expansion of the inner shell to that of the inner circumference of the pipe as each bracketted end is urged apart.

In U.S. Pat. No. 2,098,088 there is shown a thread protector for the interior of a pipe which includes hinging means and a hand-operated lever to open and close the hinge. After the thread protector is inserted within the pipe, the lever is pushed against the inner surface of the protector to close the hinge and secure the protector within the pipe. The protector of U.S. Pat. No. 1,715,792 includes a plurality of radially extending bolts disposed between a hub and a cylindrical inner shell. Adjustment of the bolts with respect to the hub either pushes the inner shell against, or retracts the inner shell from, the inner surface of the pipe.

The use of a wedge is disclosed in U.S. Pat. No. 2,156,221. The thread protector of that patent is adapted to accommodate a tapered wedge key. After the protector is in place within the pipe, the wedge key remains on the structure to provide the locking means. Should the pipe undergo impact or the like however, the wedge could be jarred loose and fall from the thread protector so that the thread protector may become separated from the pipe.

SUMMARY OF THE INVENTION

The bevel end protector of the present invention overcomes the shortcomings of end or thread protectors known to the prior art. The invention relates to an inexpensively-constructed bevel end protector for preserving the finished ends of steel pipes and the like wherein the end protector is frictionally held within the pipe to prevent accidental removal of such during the transportation and handling of the pipe. The end protector in accordance with the present invention is installed within the pipe and includes downwardly deformable urging means adapted to urge the end protector against the interior of the pipe, for frictionally securing the end protector therein. Removal of the present invention from the pipe is effected by upwardly deforming the urging means to decrease the circumference of the end protector until insufficient contact is made between the end protector and the interior surface of the pipe to hold the protector in place.

The simple construction of the beveled end protector in accordance with the present invention provides for easy installation and removal of the protector with respect to the end of the pipe which it is protecting. This same construction also provides for very inexpensive fabrication so that the beveled end protector of the present invention constitutes a low-cost, throw-away item after use. It further permits inexpensive fabrication of end protectors for pipes or conduits of any diameter.

The beveled end protector of the present invention includes a circumferentially expansible, collar-like member adapted for insertion into the pipe. The collar-like member is sufficiently pliable to be circumferentially expansible by forcing apart its two spaced-apart ends without the occurence of cracking or chipping, but is otherwise rigid. A plurality of upstanding tabs extend radially outwardly from the collar-like member to support the collar-like member at a particular position within the pipe and to prevent inadvertent axial advancement of the end protector further within the pipe.

Positioned within the pipe, the collar-like member receives a wedge for initially urging apart its spaced-apart ends so that the circumference of the collar-like member expands until it engages the interior surface of the pipe and is thereby frictionally held in place. An urging member is provided bridging the spaced apart ends. The urging member includes opposing distal flange portions and an offset central portion in integral connection therebetween. Once made to connect the spaced-apart ends of the collar-like member, the urging member is downwardly deformed at its offset portion to likewise provide a force urging apart the spaced-apart ends of the collar-like member so that the wedge can be removed while the collar-like member, urged into frictional contact with the inner wall of the pipe, remains in place therein.

A method of protecting the beveled ends of a steel pipe comprises inserting a collar-like member having two spaced-apart ends to a predetermined distance within the pipe and applying an initial force between the spaced-apart ends for expanding the circumference of the collar-like member to substantally equal that of the interior wall of the pipe. The collar-like member is thereby frictionally held within the pipe. An urging member, having distal flange portions and a central offset portion, is attached between the spaced-apart ends. Impulsive forces for downwardly deforming the urging member are delivered to the offset portion. Such impulsive forces are translated to forces for urging apart the spaced-apart ends of the collar-like member upon deformation of the offset portion so the the initial force can be removed.

In accordance with the present invention, a method of fabricating a beveled end protector comprises the steps of obtaining a strip of substantially rigid sheet metal having a longitudinal length greater than the circumference of the protected pipe. A transverse cut is made near one end of the strip to define a first rectangular piece therefrom and such first rectangular piece is machined to have opposing distal flange portions and a central offset portion. A second beveled cut is made in the strip to define a wedge and the remaining portion of the strip, having corresponding beveled and squared ends is rolled to form a collar-like member having a circumference slightly less than that of the interior wall of the pipe.

BRIEF DESCRIPTION OF THE DRAWINGS

These and other aspects and advantages of the present invention are more apparent from the following detailed description and claims, particularly when considered in conjunction with the accompanying drawings in which like parts bear like reference numerals:

DESCRIPTION OF THE PREFERRED EMBODIMENT

Figure 1:
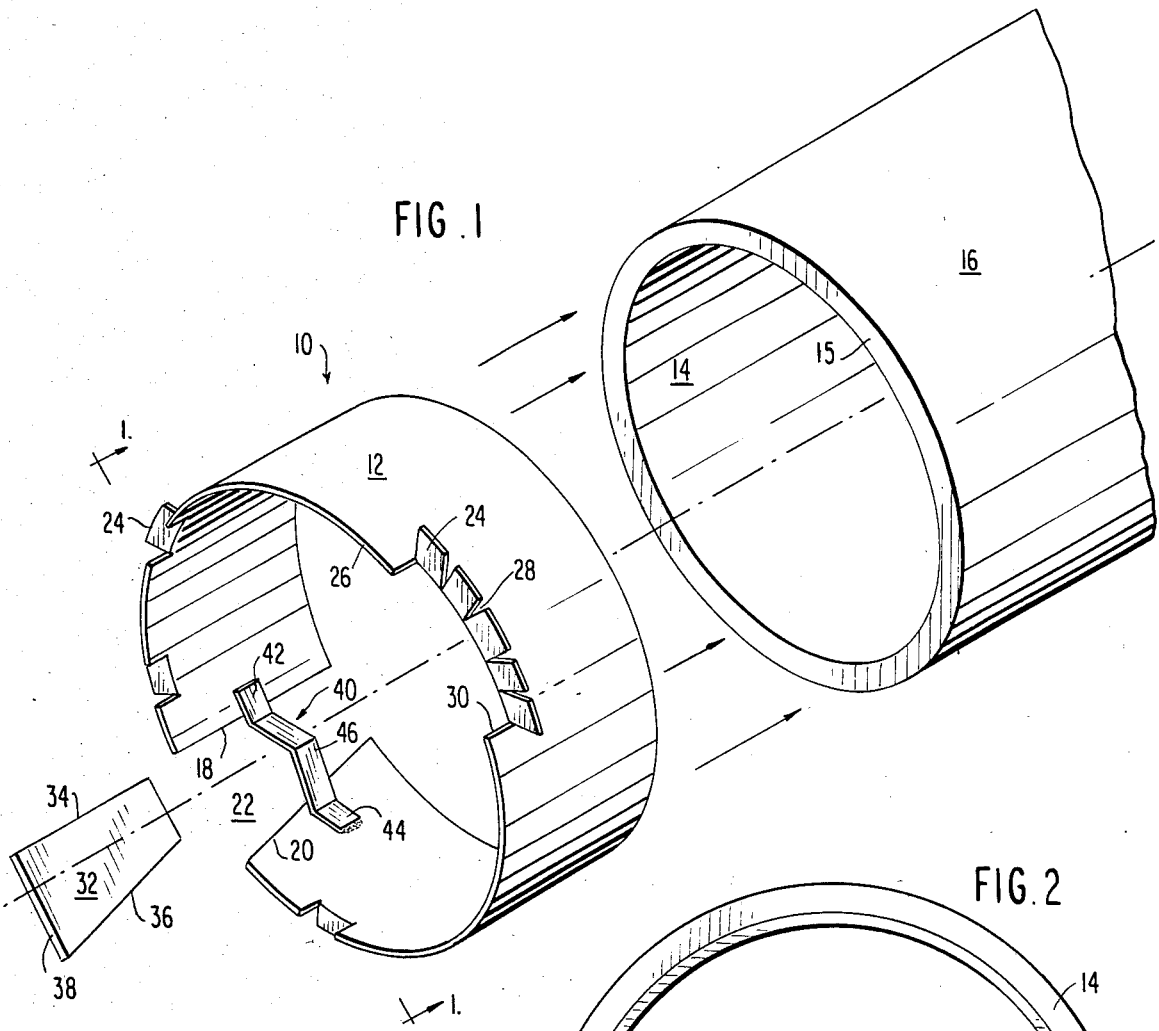
FIG. 1 is an exploded view of the beveled end protector in accordance with the present invention in combination with a pipe.

As best seen from FIG. 1, the bevel end protector 10 of the present invention includes a rolled, collar-like member 12 for fitting within the wall 14 of protected pipe 16 as shown by the arrows in that figure. Asymmetrical ends 18 and 20 define variable spacing 22 therebetween. Collar-like member 12 preferably is constructed of inexpensive sheet metal or the like to be substantially rigid but flexibly yielding in response to sufficient outwardly urging forces applied between ends 18 and 20 to increase the width of spacing 22. Member 12 may be rolled from light gauge steel or the like in ways well known to those skilled in the art. It is highly desirable that the material selected for construction of member 12 have a thickness of about ⅛" and be just sufficiently pliable to permit the increasing of the circumference of member 12 by the forcing apart of ends 18 and 20 without adverse cracking or chipping occurring in member 12.

In the preferred embodiment of FIG. 1, the circumference of collar-like member 12, inclusive of spacing 22, is chosen to be just less than that of pipe 16. Thus, member 12 can freely slide into or out of concentric association with the end 15 of protected pipe 16.

A plurality of upstanding tabs 24 extend radially outwardly from collar-like member 12. Tabs 24 extend outwardly to beyond the outer circumference of pipe 16 so that tabs 24 will contact the end 15 of wall 14 as member 12 is inserted within pipe 16 and thereby prevent further axial advance of end protector 10 within protected pipe 16. As is evident to one skilled in the art, tabs 24 may be integrally formed along outer rim 26 of collar-like member 12 by cutting paired slits 28 at predetermined positions along rim 26 and then upwardly bending the tab 24 defined thereby. Further seen in FIG. 1, five tabs 24 are consecutively arranged along rim 26 to define a handling slot 30. Thus where pipe 16 has end protectors 10 installed at each of its ends, cranes or the like may grasp the pipe 16 by means of handling slots 30 without harm to the pipe during transport thereof.

In the preferred embodiment, end 18 is cut perpendicularly, or squared with respect to collar-like member 12 while end 20 is cut at a beveled angle with respect thereto. Wedge 32 has sides 34 and 36 respectively corresponding to squared end 18 and beveled end 20. Wedge 32 is preferably formed of the same material as collar-like member 12. However, wedge 32 may be constructed from even more rigid material than member 12. Wedge 32 should not be made from material so hard as to be brittle and be likely to undergo chipping or cracking upon impact, as by hammering at face portion 38.

As seen from FIG. 1, wedge 32 also has a thickness equal to or exceeding the thickness of member 12 so that, when member 12 is positioned within pipe 16, wedge 32 may be driven between ends 18 and 20 without the loss of contact between the portions of end 18 and side 34 and the portions of end 20 and side 36 which come into abutting contact as wedge 32 initially urges apart ends 18 and 20. Wedge 32 further has a width such that as wedge 32 is driven between squared and beveled ends 18 and 20, spacing 22 is enlarged to the point where the outer circumference of member 12 equals the inner circumference of the pipe wall 14. Thus, after member 12 is appropriately installed within pipe 16, wedge 32 may be driven between ends 18 and 20 to initially force apart ends 18 and 20 until the circumference of member 12 substantially matches that of the interior of pipe 16 and collar-like member 12 is securely held therein.

As also apparent to those skilled in the art, the relationship between edges 34 and 36 of wedge 32 and ends 18 and 20 may be any that results in the increase of spacing 22 and therefor the circumference of collar-like member 12 as wedge 32 is driven therein. Thus, ends 18 and 20 and edges 34 and 36 all may be of the beveled type.

Figure 2:
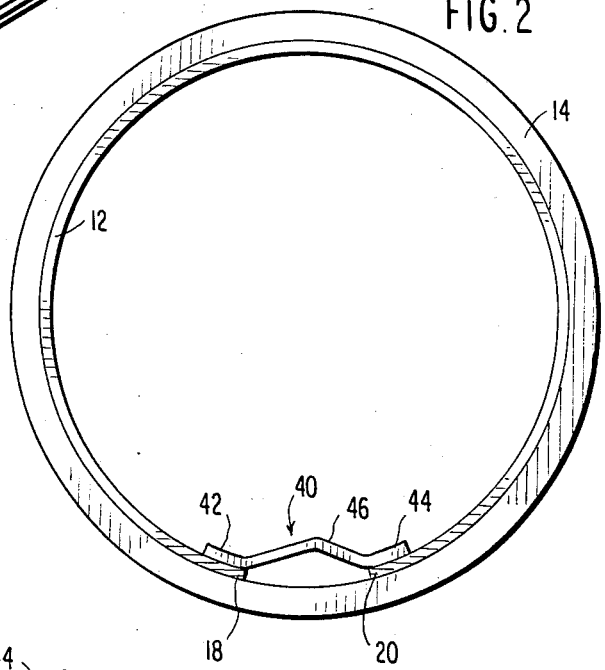
FIG. 2 is an elevational view of the end protector taken along the line 1—1 of FIG. 1 wherein the beveled end protector is inserted within the pipe but not secured thereto.
Figure 3:
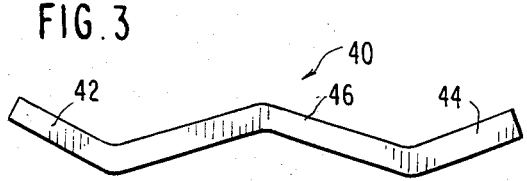
FIG. 3 is a sectional view of the urging member of FIGS. 1 and 2.

Shown prior to deformation in FIGS. 1-3, urging member 40, which may be in the form of a strap, includes a pair of distal flange portions 42 and 44 and offset central portion 46 extending therebetween. Flange portions 42 and 44 are turned slightly upward to approximately conform to the curve of collar-like member 12. Upwardly turned flange portions 42 and 44 thereby provide for secure attachment of urging member 42 betweeen beveled ends 18 and 20 as by welding or in any other manner known to those skilled in the art.

Figure 4:
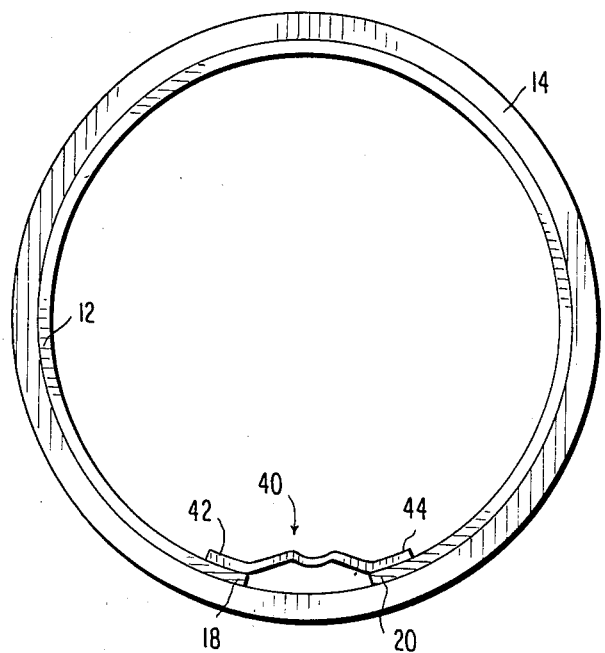
FIG. 4 is an elevational view, similar to FIG. 2, wherein the beveled end protector is fully installed within the pipe.

In the preferred embodiment, urging member 40 is also constructed from the same material, or material similar to that of collar-like member 12. Urging member 40 is chosen to be substantially rigid, like member 12, however urging member 40 yields to a deformed or flexed shape as shown in FIG. 4 upon sharp blows to central portion 46 as by a hammer.

It is preferably desirable that urging member 40 deforms to its flexed position as a result of one or very few hammer blows. To this end, in FIGS. 1-3 central portion 46 is shown as being substantially V-shaped. However, as is apparent to those skilled in the art, other configurations for the central portion will provide the requisite result. In the preferred embodiment, one distal flange, flange 44 as indicated in FIG. 1, is welded to either end 18 or 20 (end 20 shown) prior to insertion of collar-like member 12 into pipe 16. After wedge 32 initially forces apart ends 18 and 20 and thereby increases the circumference of collar-like member 12 to substantially that of the interior of pipe 16, opposing flange portion 42 is spot welded near end 18. In this configuration urging member 40 forms a "bridge" joining ends 18 and 20. To securely hold end protector 10 within pipe 16, impulsive forces, such as by a hand-held hammer, are applied to central portion 46 to deform it downwardly as shown in FIG. 4. Thus as central portion 46 is flattened, urging forces are transmitted from central portion 46 to ends 18 and 20 via welded distal flanges 42 and 44 to impart expansive forces against ends 18 and 20. Under these expansive forces, collar-like member 12 is urged to maintain a circumference substantially equalling that of the interior of pipe 16 regardless of the presence of wedge 32. Indeed, wedge 32 is now preferably removed and end protector 10 is securely held in place within pipe 16 by the frictional forces between collar-like member 12 and the interior of pipe 16, produced as a result of the urging forces continuously applied by deformed member 40. In this position, end protector 10 is fully installed and pipe 16 may be freely transported without fear of damaging the protected end 14 of pipe 16. Since urging member 40 is welded to collar-like member 12, member 40 is prevented from coming loose and allowing the end protector 10 to fall out of the pipe.

Figure 5:
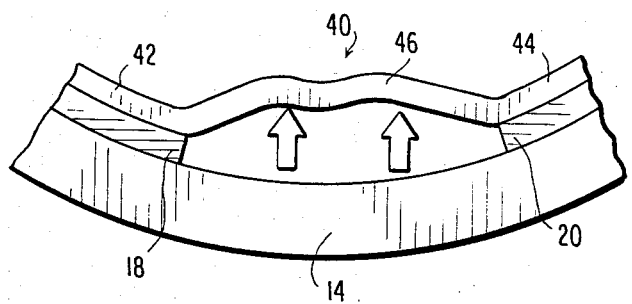
FIG. 5 is a sectional view, showing the deinstallation or removal of the installed end protector of FIG. 4.

FIG. 5 indicates the application of force to effect removal of end protector 10. Removal of end protector 10 may be effected with a prying tool (not shown) which may comprise any well known implement for prying, such as a crowbar or the like having, for instance, a flattened head (not shown) for engaging and upwardly compelling central portion 40 to relieve forces imparted thereby to ends 18 and 20. End protector 10 is then simply removed by pulling it from pipe 16.

Figure 6:
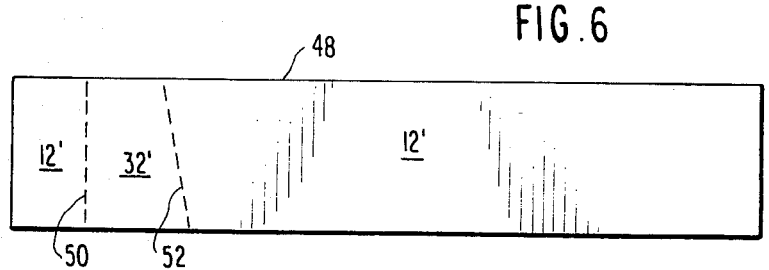
FIG. 6 is an elevational view of a layout for fabricating beveled end protectors in accordance with the present invention.

Preferably, end protector 10 is economically fabricated from a single strip of sheet metal having the particular characteristics and thickness as described above. Accordingly, FIG. 6 shows sheet metal strip 48 including sections 40', 32' and 12' corresponding to an urging member, a wedge and an unrolled collar-like member respectively. Thus strip 48 is cut transversely as indicated along broken line 50 to form urging member section 40' which is thereafter machined in any conventional way to form urging member 40 having opposing distal flanges 42 and 44 and offset portion 46 therefrom. As is evident to one skilled in the art, remaining uncut sections 32' and 12' have a cumulative longitudinal length slightly exceeding that of the interior circumference of the pipe to be protectd. Remaining sections 32' and 12' are cut-apart along beveled line 52 to form wedge 32. At this point, slits 28 are cut in the prescribed manner along rim 26' of section 12'. Collar-like member section 12' is then likewise machined in any of well known ways to provide cylindrical shape and upstanding tabs 24. Preferably, either of flanges 42 or 44 is then welded near one end of machined collar-like member 12.

Figure 7:
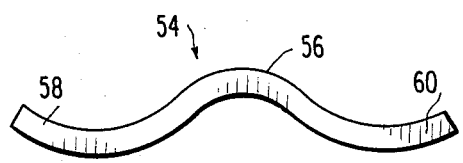
FIG. 7 is a sectional view of an alternate embodiment of the urging member in accordance with the present invention.

In FIG. 7, there is shown an alternate form of an urging member 54. Member 54 is seen to include a U-shaped offset portion 56. Opposing flange portions 58 and 60 integrally extend from offset flange portions 56 in the manner described in the foregoing.

By way of example, member 12, with flanged portion 44 of urging member 40 welded near beveled end 20, is inserted into pipe 16 to the point where tabs 24 abut against wall 14. Collar-like member 12 slides into pipe 16 with relative ease since its circumference is less than that of the interior of pipe 16. Next, wedge 32 is inserted as by hand into spacing 22 between ends 18 and 20 until sides 34 and 36 of wedge 32 contact ends 18 and 20. At this point, wedge 32 is driven between ends 18 and 20 by impulses at face 38 until the circumference of member 12, expanded by driven-in wedge 32, substantially equals that of wall 14 of pipe 16.

Opposing distal flange portion 42 is then spot-welded or similarly attached near end 18. At this point, central portion 46 is deformed by impacting forces, as by a blow by a hand-held hammer. Such impulses are translated by urging member 40, to forces tending to push apart ends 18 and 20. Thus the force originally applied by driven-in wedge 32 is also applied by deformed urging member 40 and wedge 32 is removed. Upon deformation of urging member 40 to apply expansive forces to collar-like member 12, end protector 10 is frictionally retained within pipe 16 to fully protect such.

When pipe 16 is ready for use, installed end protector 10 is removed by relaxing the force applied by deformed urging member 40 against ends 18 and 20. To eliminate this force, a pry bar (not shown) is used to pry underneath member 40 to raise central portion 46. Prying up central portion 46 diminishes spacing 22 so that the circumference of collar-like member 12 contracts to less than that of pipe 16. End protector 10 is then simply slid from engagement with pipe 16.

Although the present invention has been described primarily with reference to a preferred embodiment, rearrangement and modifications may be made by one skilled in the art within the scope of the invention.

What is claimed is:

1. A bevel end protector for protecting the bevel end of a pipe comprising:
    a circumferentially expansible, collar-like means, having spaced apart ends and being adapted for insertion into the pipe, for protecting the end of the pipe;
    wedge means adapted to be received between said space-apart ends, for applying an initial expanding force to expand the circumference of the collar-like means to equal the circumference of the interior of the pipe; and
    urging means, adapted to connect said spaced-apart ends, said urging means being structurally deformable for thereafter maintaining said initial circumferentially expanding force on said collar-like means whereby said wedge means is removable.

2. The bevel end protector as defined in claim 1, wherein said urging means urges apart said spaced-apart ends.

3. A bevel end protector for protecting the bevel end of a pipe comprising:
    a circumferentially expansible, collar-like means, having spaced apart ends and being adapted for insertion into the pipe, for protecting the end of the pipe;
    wedge means adapted to be received between said spaced-apart ends, for applying an initial expanding force to expand the circumference of the collar-like means to equal the circumference of the interior of the pipe; and
    urging means, adapted to connect said spaced-apart ends, for urging apart said ends and maintaining said initial circumferentially expanding force on said collar-like means upon structural deformation of said urging means, said urging means including flange portions adapted for attachment to said spaced-apart ends and an offset portion, projecting inwardly of said collar-like means and the pipe for structurally deforming downwardly toward the interior wall of the pipe in response to impulsive forces delivered thereon.

4. The bevel end protector as claimed in claim 3 wherein said impulsive forces are delivered by a hand-held hammer.

5. The bevel end protector as defined in claim 4 wherein said offset portion is U-shaped.

6. The bevel end protector as defined in claim 5 wherein said offset portion is V-shaped.

7. The bevel end protector as defined in claim 3 further comprising a plurality of upstanding tabs, projecting radially outwardly of said collar-like means, for positioning said collar-like means within the pipe.

8. The bevel end protector as defined in claim 7 wherein at least one of said tabs is arranged to define a handling slot.

9. In combination with a pipe having beveled ends, a bevel end protector for protecting an end of said pipe comprising:
   circumferentially expansible, collar-like means, within the pipe, said collar-like means including two spaced-apart ends defining a longitudinal slot therebetween;
   a wedge for initially spacing apart said ends; and
   urging means, adapted to connect said spaced-apart ends of said collar-like means within the pipe, for selectively urging apart said ends to circumferentially expand said collar-like means within the pipe upon structure deformation of said urging means, and whereby said wedge is removeable and urging together said ends to circumferentially contract said collar-like means within the pipe allowing removal of the end protector.

10. The bevel end protector as claimed in claim 9, wherein said urging means includes flange portions adapted for attachment to said spaced-apart ends and an offset portion, projecting inwardly of the pipe for structurally deforming downwardly toward the interior wall of the pipe in response to impulsive forces delivered thereto.

* * * * *